United States Patent
Iribe et al.

(10) Patent No.: US 9,552,670 B1
(45) Date of Patent: Jan. 24, 2017

(54) SYSTEM AND METHOD FOR TRIANGULATION OF NON-SIMPLE, MULTIPLY-CONNECTED, MULTI-STYLED SHAPES

(75) Inventors: Brendan Iribe, Highland, MD (US); Maxim Shemanarev, West Chester, PA (US); Michael Antonov, Highland, MD (US)

(73) Assignee: AUTODESK, INC., San Rafael, CA (US)

( * ) Notice: Subject to any disclaimer, the term of this patent is extended or adjusted under 35 U.S.C. 154(b) by 1627 days.

(21) Appl. No.: 12/073,065

(22) Filed: Feb. 28, 2008

Related U.S. Application Data

(60) Provisional application No. 60/903,853, filed on Feb. 28, 2007.

(51) Int. Cl.
| | | |
|---|---|---|
| *G06T 17/20* | (2006.01) | |
| *G06T 15/00* | (2011.01) | |
| *G06T 15/04* | (2011.01) | |
| *G06T 11/40* | (2006.01) | |

(52) U.S. Cl.
CPC ............. *G06T 17/20* (2013.01); *G06T 17/205* (2013.01); *G06T 11/40* (2013.01); *G06T 15/005* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 5,129,051 A * | 7/1992 | Cain ............................ | 345/423 |
| 5,377,320 A * | 12/1994 | Abi-Ezzi ................ | G06T 17/20 345/419 |
| 6,111,587 A | 8/2000 | Covey et al. | |
| 6,693,719 B1 * | 2/2004 | Gupta et al. ................. | 358/1.15 |
| 7,423,643 B2 * | 9/2008 | Kallay .......................... | 345/423 |
| 2005/0126352 A1 * | 6/2005 | Suh .................... | G05B 19/4097 82/1.11 |
| 2008/0260283 A1 * | 10/2008 | Ivansen et al. ............... | 382/266 |

* cited by examiner

Primary Examiner — Jwalant Amin
(74) Attorney, Agent, or Firm — Artegis Law Group, LLP

(57) ABSTRACT

Disclosed is a system and method for triangulating vector graphics data having non-simple multi-styled and multi-connected shapes. The method provides for geometry flattening and more efficient processing of horizontal edges. The method involves computing a plurality of monotone chains corresponding to each of the plurality of shapes; computing a plurality of scan beams corresponding to the plurality of monotone chains; computing a plurality of monotone polygons corresponding to the monotone chains; computing a plurality of triangles from the plurality of monotone polygons; and displaying the plurality of triangles on the computer display.

28 Claims, 16 Drawing Sheets

| MONOTONE CHAIN | LEFT STYLE | RIGHT STYLE | VERTICES | DIRECTION |
|---|---|---|---|---|
| 0 | NONE | RED | TABCD | +1 |
| 1 | RED | NONE | ED | -1 |
| 2 | GREEN | NONE | IHGE | -1 |
| 3 | GREEN | BLUE | UI | -1 |
| 4 | RED | GREEN | UVE | +1 |
| 5 | RED | BLUE | TU | -1 |
| 6 | NONE | BLUE | ST | -1 |
| 7 | BLUE | NONE | SRQ | +1 |
| 8 | NONE | BLUE | IJK | -1 |
| 9 | BLUE | GREEN | QN | +1 |
| 10 | GREEN | NONE | QPON | -1 |
| 11 | BLUE | NONE | NMLK | +1 |

| MONOTONE CHAIN | VERTICES | DIRECTION |
|---|---|---|
| [0] | $A_1 B_1 C_1$ | -1 (DOWN) |
| [1] | $A_1 L_1 K_1 J_1 I_1$ | +1 (UP) |
| [2] | $H_1 G_1 F_1 E_1 D_1 C_1$ | +1 (UP) |
| [3] | $H_1 I_1$ | -1 (DOWN) |

310

| MONOTONE CHAIN | VERTICES | DIRECTION |
|---|---|---|
| [4] | $A_2 B_2 C_2$ | -1 |
| [5] | $J_2 I_2 H_2$ | +1 |
| [6] | $E_2 D_2$ | +1 |
| [7] | $F_2 G_2$ | -1 |

| MONOTONE CHAIN | VERTICES | DIRECTION |
|---|---|---|
| [8] | $A_3 B_3 C_3 D_3 E_3 F_3$ | -1 |
| [9] | $A_3 L_3 K_3 J_3 I_3 H_3 G_3 F_3$ | +1 |

| MONOTONE CHAIN | LEFT STYLE | RIGHT STYLE | VERTICES | DIRECTION |
|---|---|---|---|---|
| 0 | NONE | RED | TABCD | +1 |
| 1 | RED | NONE | ED | -1 |
| 2 | GREEN | NONE | IHGE | -1 |
| 3 | GREEN | BLUE | UI | -1 |
| 4 | RED | GREEN | UVE | +1 |
| 5 | RED | BLUE | TU | -1 |
| 6 | NONE | BLUE | ST | -1 |
| 7 | BLUE | NONE | SRQ | +1 |
| 8 | NONE | BLUE | IJK | -1 |
| 9 | BLUE | GREEN | QN | +1 |
| 10 | GREEN | NONE | QPON | -1 |
| 11 | BLUE | NONE | NMLK | +1 |

SYSTEM AND METHOD FOR TRIANGULATION OF NON-SIMPLE, MULTIPLY-CONNECTED, MULTI-STYLED SHAPES

This application claims the benefit of U.S. Provisional Patent Application No. 60/903,853, filed on Feb. 28, 2007, which is hereby incorporated by reference for all purposes as if fully set forth herein.

BACKGROUND

1. Field of the Invention

The present invention generally relates to computer graphics. More particularly, the present invention relates to software and hardware accelerated display of vector graphics data.

2. Discussion of the Related Art

Advances in video processing technology have enabled real time display of complex moving images using commercially available computer hardware. Applications of such video processing technology include computer games, video content downloaded over the internet, music videos displayed on personal digital devices, and video displayed on cell phones. Further recent advances have enabled 3D graphics to be displayed on computer displays, personal digital devices, and cell phones.

Essential to the advance of video processing technology has been the use of vector graphics data formats in representing images. Representing an image as a set of vectors has not only vastly increased the efficiency in transmitting and storing video data (as opposed to raster scan or bitmap representations), but it has enabled video content to be scalable. Scalability refers to the ability to render an image or video with varying degrees of resolution depending on the display hardware displaying the images or video, and/or on other considerations such as bandwidth. In other words, the resolution of an image displayed on a cell phone will be different from that displayed on a high resolution monitor, and the quality of video streamed via a low bandwidth connection will be different from that streamed via a high bandwidth connection. In any of these cases, vector graphics representation of images or video allows one data format to be used regardless of the display device or bandwidth.

Displaying vector graphics data typically involves converting the data into a plurality of triangles, wherein each triangle has a style (e.g., color), shape, and location. Accordingly, depending on the complexity of the image, this may involve thousands of triangles. Converting vector graphics data into a plurality of triangles is referred to as triangulation, or tessellation. Accordingly, efficiently displaying vector graphics data requires the ability to quickly and reliably tessellate the data.

Many related art approaches to tessellation incur certain disadvantages. First, many related art tessellation algorithms have a computational cost that can vary a great deal depending on the content of the image to be displayed. As a result, they are not suitable for consistent real time use without a separate preprocessing step. Second, certain related art tessellation algorithms are unstable in that an error or anomaly in depicting a small feature can corrupt the displayed image or cause the display device to crash. Third, many related art approaches suffer from problems associated with layered polygons, in which polygons are rendered independently in separate layers. This can lead to what is referred to as the "group opacity" problem, when multiple layers are rendered with varying opacity, as might happen when a multi-layered polygon is meant to fade in a series of images. And finally, related art approaches to vector graphics typically generate polygons independently, so that polygons that have a shared edge are each given separate edges. This can lead to the appearance of seams between rendered polygons. As used herein, a polygon may refer to any figure to be displayed that may be tessellated for the purpose of being rendered on a display device.

The latter three of the above problems may be mitigated by "flattening" the geometry of polygons that are to be displayed. However, related art approaches to tessellation that use multiple layers are ill-suited to geometry flattening. Further, related art approaches typically do not handle "non-simple" cases when processing vector graphics data. Non-simple cases include fully or partially overlapped edges, polygon edges that pass through vertices of edges of other polygons, more than two polygon edges having a shared vertex, and crossing edges (self-intersections).

Accordingly, what is needed is a system and method for processing vector graphics data that flattens the geometry of multiple polygons, provides for polygons having shared edges, handles errors in a stable manner, and is computationally efficient.

SUMMARY OF THE INVENTION

The present invention provides a system and method for triangulation of non-simple, multiply-connected, and multi-styled shapes that obviates one or more of the aforementioned problems due to the limitations of the related art.

Accordingly, one advantage of the present invention is that it more efficiently processes vector graphics data;

Another advantage of the present invention is that it more effectively processes non-simple cases in rendering vector graphics data.

Another advantage of the present invention is that it provides for better display of 2D graphics using existing 3D graphics hardware.

Another advantage of the present invention is that it is more stable in handling errors and degeneracies in input data.

Another advantage of the present invention is that it removes invisible edges in polygons in processing vector graphics images.

Another advantage of the present invention is that it reduces the number of triangles used to represent polygons in vector graphics images.

Another advantage of the present invention is that it reduces the amount of memory required for processing vector graphics data.

Additional advantages of the invention will be set forth in the description that follows, and in part will be apparent from the description, or may be learned by practice of the invention. The advantages of the invention will be realized and attained by the structure pointed out in the written description and claims hereof as well as the appended drawings To achieve these and other advantages, the present invention involves computer-implemented method for displaying an image having a plurality of multi-styled shapes on a computer display. The computer-implemented method comprises creating a plurality of monotone chains corresponding to each of the plurality of multi-styled shapes; assigning a plurality of scan beams corresponding to the plurality of monotone chains; identifying a left style and a right style corresponding to each of the plurality of monotone chains between two adjacent scan beams; computing a plurality of monotone polygons corresponding to the monotone chains; and computing a plurality of triangles from the plurality of monotone polygons.

In another aspect of the present invention, the aforementioned and other advantages are achieved by a computer readable medium encoded with a program for displaying an image having a plurality of multi-styled shapes, in which the program comprises the steps of creating a plurality of monotone chains corresponding to each of the plurality of multi-styled shapes; assigning a plurality of scan beams corresponding to the plurality of monotone chains; identifying a left style and a right style corresponding to each of the plurality of monotone chains between two adjacent scan beams; computing a plurality of monotone polygons corresponding to the monotone chains; and computing a plurality of triangles from the plurality of monotone polygons.

In another aspect of the present invention, the aforementioned and other advantages are achieved by a system for displaying an image having a plurality of multi-styled shapes. The system comprises a display device; a processor coupled to the display device; and a computer readable medium coupled to the processor, the computer readable medium encoded with a program for displaying an image having a plurality of multi-styled shapes, the program comprising the steps of creating a plurality of monotone chains corresponding to each of the plurality of multi-styled shapes; assigning a plurality of scan beams corresponding to the plurality of monotone chains; identifying a left style and a right style corresponding to each of the plurality of monotone chains between two adjacent scan beams; computing a plurality of monotone polygons corresponding to the monotone chains; computing a plurality of triangles from the plurality of monotone polygons; and displaying the plurality of triangles on the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
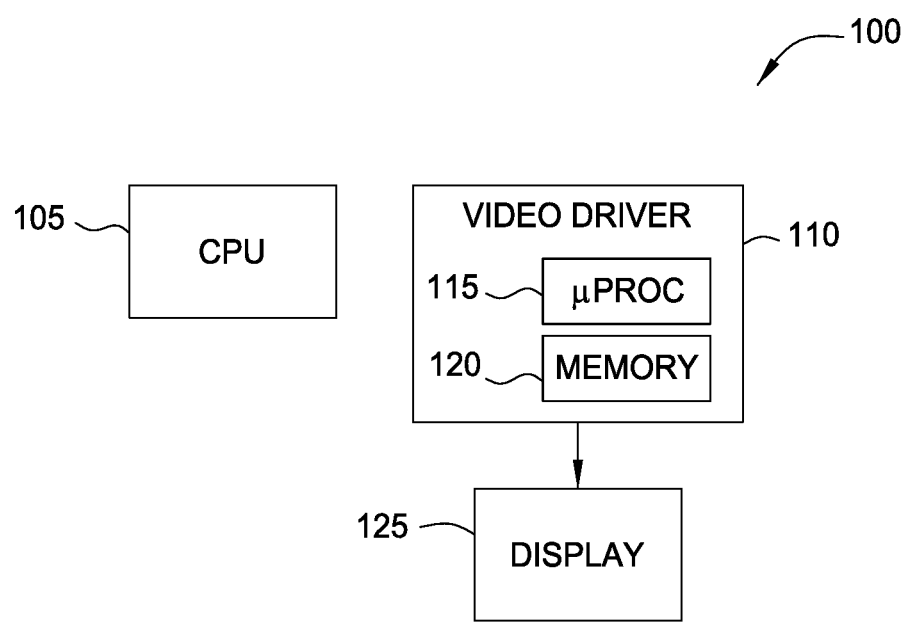
FIG. 1 illustrates an exemplary system for displaying vector graphics-based images and video.

FIG. 1 illustrates an exemplary system 100 for displaying vector graphics-based images and video. System 100 includes a central processing unit (CPU) 105, a video driver 110, and a display 125. System 100 may be a component of a commercially available desktop computer or laptop. System 100 may also be an embedded component of a special-purpose device, such as a cell phone or a set top box.

Video driver 110 includes a microprocessor 115 and a memory 120. Microprocessor 115 may include one or more processors that process image data provided by CPU 105 into a format suitable for display on display 125. Microprocessor 115 may include video accelerator hardware that is commercially available.

Memory 120 is a computer readable medium encoded with machine readable instructions and data for implementing processes associated with the present invention. Memory 120 may be integrated with microprocessor 115; it may be installed on video driver 110 and connected to microprocessor 115; it may be remotely located from video driver board 110, whereby the software may be downloaded from CPU 105 to video driver board 110 as needed; or any combination of these configurations.

Display 125 may be a physical image generation device such as a liquid crystal display (LCD) or similar. Additionally, display 125 may be a memory buffer contained in memory 120 or CPU 105, or it may be a separate device capable of receiving, storing or processing image data.

Video driver 110 may be integrated within either CPU 105, display 125, or its functionality may be distributed between both. It will be readily apparent to one skilled in the art that many different architectures for system 100 are possible and within the scope of the invention.

For the sake of ease of description, processes associated with the present invention will be described as instructions being executed by microprocessor 115. However, one skilled in the art will recognize that the instructions may be executed by microprocessor 115, CPU 105, or both in a distributed manner.

Figure 2:
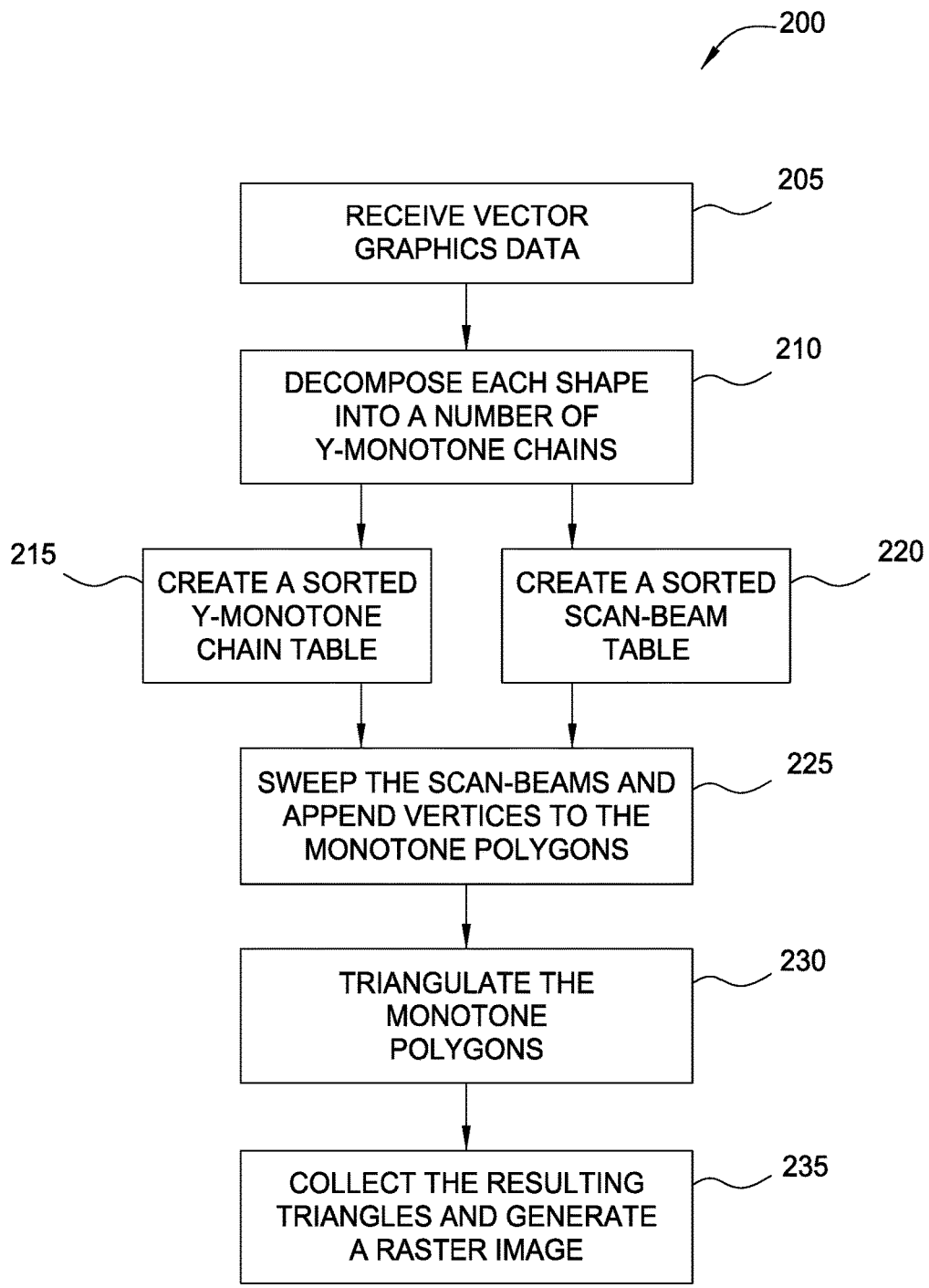
FIG. 2 illustrates an exemplary process for triangulating polygons, associated with the present invention.

FIG. 2 illustrates an exemplary triangulation process 200 associated with the present invention. Process 200 may be performed, all or in part, by microprocessor 115 executing instructions stored in memory 120.

At step 205, video driver 110 receives vector graphics data from CPU 105, and microprocessor 115 stores the vector graphics data in memory 120. The vector graphics data may be in any standard form, including formats using multi-styled shapes.

At step 210, microprocessor 115 executes instructions to identify each polygon within the vector graphics data and decompose each polygon into a plurality of Y-monotone chains.

Further to step 210, microprocessor 115 executes instructions to create a table in memory 120 and populate the table with a plurality of monotone chains for each polygon defined in the vector graphics data.

Figures 3A, 3B:
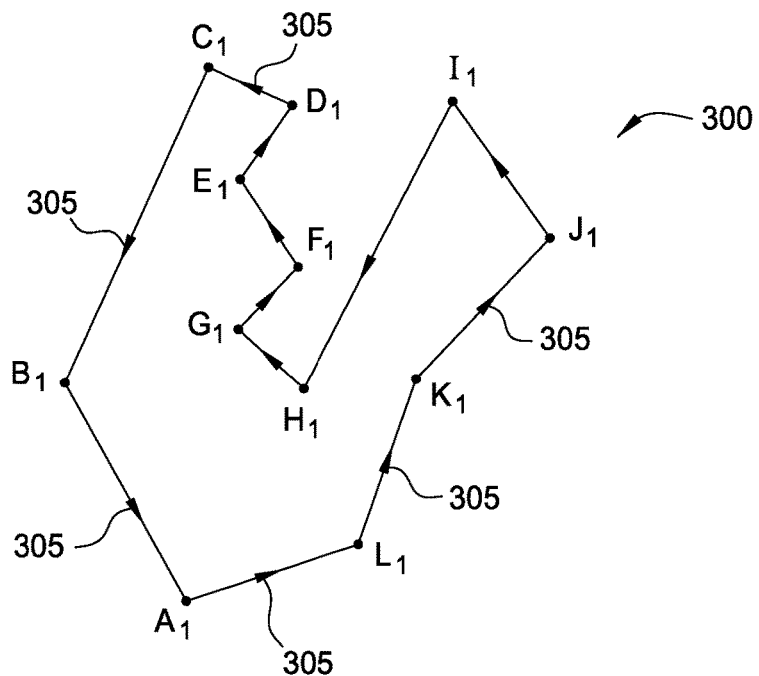
FIG. 3A illustrates an exemplary vector graphics polygon.
FIG. 3B illustrates an exemplary monotone chain table corresponding to the polygon of FIG. 3A.

FIG. 3A illustrates an exemplary shape or polygon 300 within the vector graphics data stored in memory 120 at step 205. As illustrated, polygon 300 includes a plurality of vertices $A_1$-$L_1$, and a plurality of edges 305 between each of the vertices. Each edge 305 has a direction. As used herein, a Y-monotone chain (hereinafter "monotone chain") refers to a plurality of vertices or edges that define a segment along the perimeter of a polygon such that the segment or chain has no local minima or maxima. In other words, the Y-component of the direction of edges 305 of a given monotone chain does not change sign.

FIG. 3B illustrates an exemplary monotone chain table created at step 210. Referring to FIGS. 3A and 3B, microprocessor 115 executes instructions to decompose polygon 300 into monotone chains [0-3], the vertices associated with each monotone chain [0-3], and a flag indicating the direction (e.g., up/down) of the Y-component of the direction of each monotone chain 0-3. Microprocessor 115 performs this step for each of the polygons within the vector graphics data stored in memory 120 at step 205.

Figures 3C, 3D:
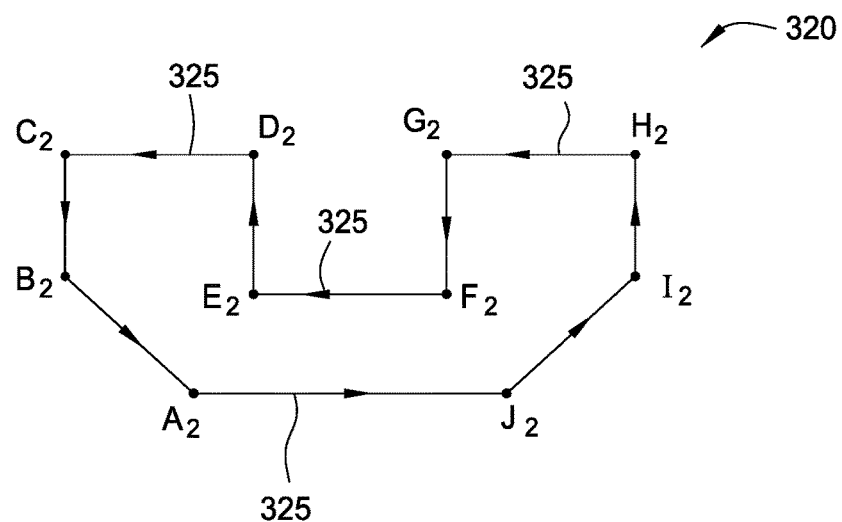
FIG. 3C illustrates an exemplary polygon having horizontal edges.
FIG. 3D illustrates an exemplary monotone chain table corresponding to the polygon of FIG. 2C.

FIG. 3C illustrates second exemplary polygon 320 having horizontal edges 325, and FIG. 3D illustrates a corresponding monotone chain table 330. Microprocessor 115 would decompose polygon 310 into monotone chains [4-7] in monotone chain table 330. Note that horizontal edges 325 do not appear in monotone chain table 320. The significance of the treatment of horizontal edges 325 will be discussed further below.

Figures 3E, 3F:
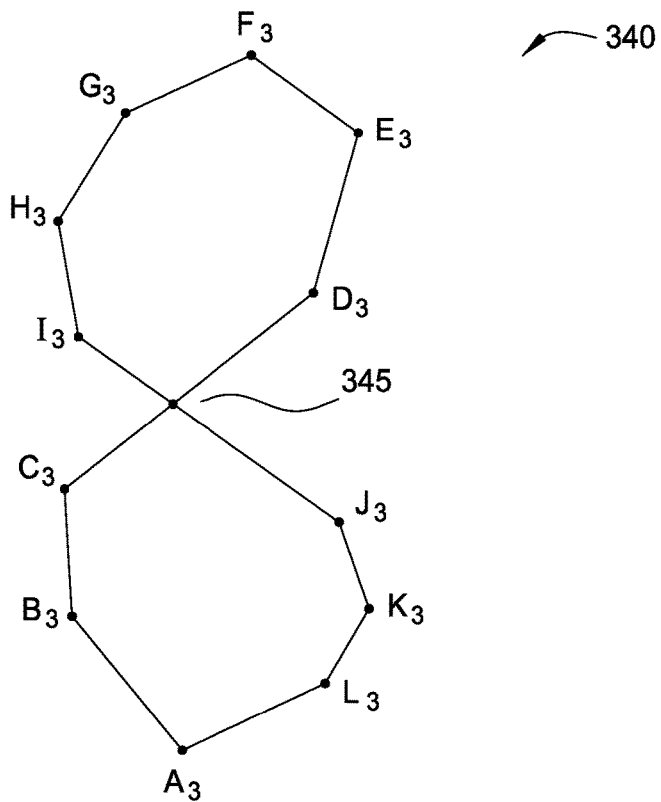
FIG. 3E illustrates an exemplary polygon having a self-intersection.
FIG. 3F illustrates an exemplary monotone chain table corresponding to the polygon of FIG. 3E.

FIG. 3E illustrates a third exemplary polygon 340 having a self-intersection 345, and FIG. 3F illustrates a corresponding monotone chain table 350. Microprocessor 115 would decompose polygon 340 into two monotone chains [8] and [9]. The significance of the self-intersection 345 will be discussed further below.

Figures 4A, 4B:
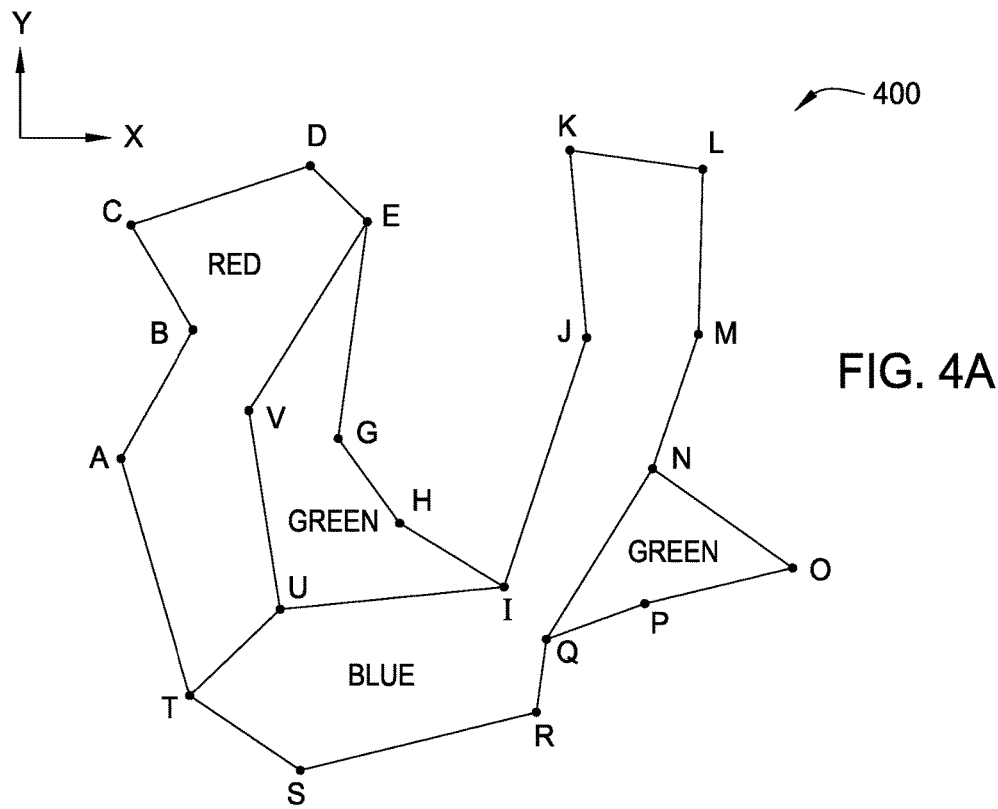
FIG. 4A illustrates an exemplary multi-styled shape.
FIG. 4B illustrates an exemplary monotone chain table corresponding to the multi-styled shape of FIG. 4A.

FIG. 4A illustrates an exemplary multi-styled shape 400 that may be within the vector graphics data stored in memory 120, and FIG. 4B illustrates an exemplary monotone chain table 450. In the event of a multi-styled shape 400, the corresponding monotone chain table 450 may have additional columns for the style (e.g., color and/or pattern) to the left and right of a given monotone chain. Note that the length of a given monotone chain is limited so that each of the edges in the chain have continuity of style to the left and right, respectively. The monotone chains in exemplary monotone chain table 450 include "event points," which are vertices that correspond to a minima/maxima, or a change in style.

Also, horizontal edges, like horizontal edges 325 of FIG. 3C, are ignored in that the vertices on each end of a given horizontal edge 325 are treated like a minima/maxima of separate monotone chain.

In creating a table of monotone chains at step 210, microprocessor 115 may execute instructions to represent each monotone chain as a linked list of edges and/or vertices, sorted by each vertex's Y-axis coordinate value. One skilled in the art will readily appreciate that many such approaches to creating a table of monotone chains are possible and within the scope of the invention.

At step 215, microprocessor 115 executes instructions to create a sorted monotone chain table, which it stores in memory 120. In doing so, microprocessor 115 executes instructions to sort the monotone chains computed and stored at step 210, and sorting them according to the Y-axis position of the "lowest" (e.g., minimum Y axis value) vertex of each monotone chain.

Microprocessor 115 may then further sort the monotone chains so that they are secondarily sorted by X-axis position of the lowest vertex of each monotone chain. However, this X-axis position sort is optional. Microprocessor 115 may then execute instructions to store the sorted monotone chain table in memory 120.

At step 220, microprocessor 115 executes instructions to create a sorted scan beam table. In doing so, microprocessor 115 executes instructions to create a series of scan beams, whereby a scan beam is a line that is parallel to the Y-axis and intersects a vertex within a monotone chain. Accordingly, there is a scan beam intersecting the Y-axis of each vertex within each monotone chain. Microprocessor 115 executes instructions to sort these scan beams by Y-axis position and store them in memory 120.

Figure 5A:
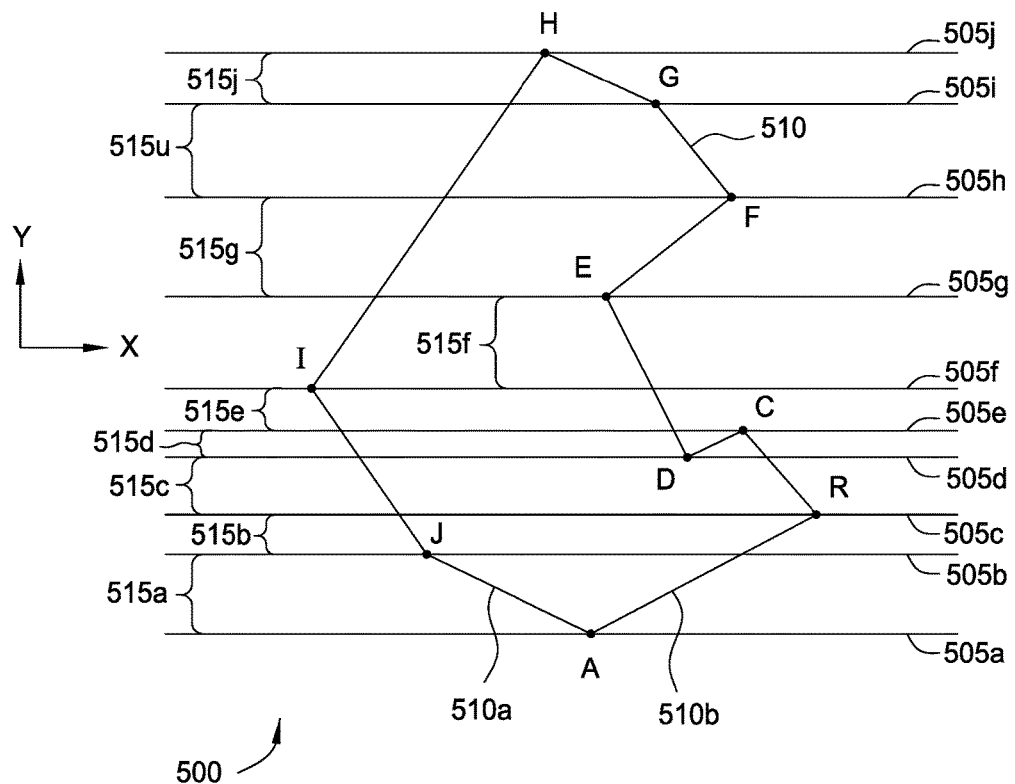
FIG. 5A illustrates an exemplary plurality of scan beams and bands.

FIG. 5A illustrates an exemplary plurality of scan beams 505a-j corresponding to an exemplary polygon 510. As illustrated, each scan beam 505a-j intersects a vertex of polygon 510. Further illustrated in FIG. 5 are a plurality of bands 515a-i, whereby bands 515a-i are defined by a lower and upper scan beam. For example, band 515a is defined by lower scan beam 505a and upper scan beam 505b, and so on.

Further to step 220, microprocessor 115 may execute instructions to remove any duplicate scan beams. This may happen if there are two or more vertices having the same Y-axis position, which may occur in the event of a horizontal edge 325 as illustrated in FIG. 3C.

At step 225, microprocessor 115 executes instructions to sweep through scan beams 505a-f and compute a plurality of monotone polygons. In doing so, microprocessor 115 executes instructions to iteratively retrieve the data corresponding to two sequential scan beams (e.g., scan beams 505a and 505b), and the band defined by the scan beams (e.g., band 515a) and process the vertices and edges corresponding to the band.

Figure 5B:
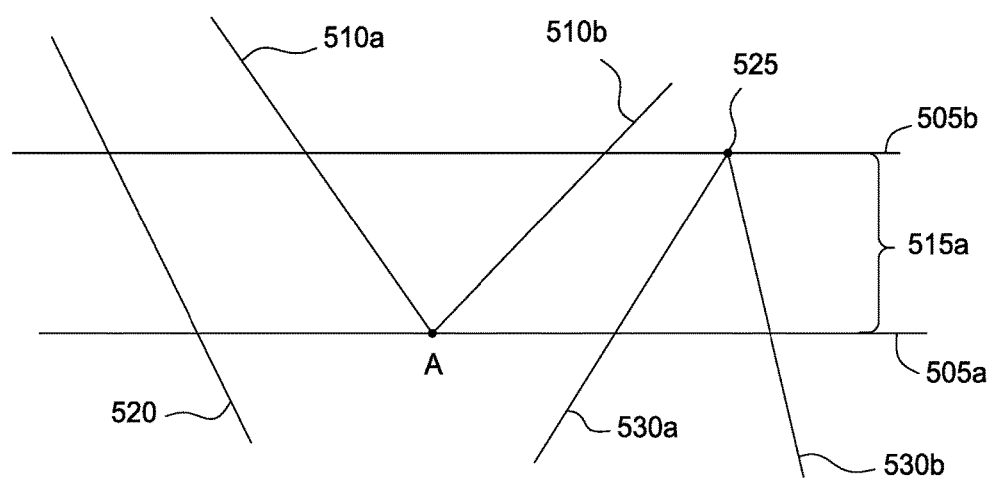
FIG. 5B illustrates an exemplary band within the plurality of bands of FIG. 5A, with additional edges.

FIG. 5B illustrates an exemplary band 515a defined by lower scan beam 505a and upper scan beam 505b. Also illustrated are vertex A of polygon 500, and edges 510a and 510b of polygon 500.

At step 225, microprocessor 115 executes instructions to step through each band 515a-i in succession, such that upper scan beam 505b of band 515a becomes the lower scan beam of the subsequent band. Further to step 225, microprocessor 115 executes instructions to create an active chain table, which may be implemented as a table in memory 120 such that each entry in the chain table may be a pointer to a relevant vertex of a given monotone chain in the monotone chain table stored in memory 120. This will be explained in further detail below.

Figure 6:
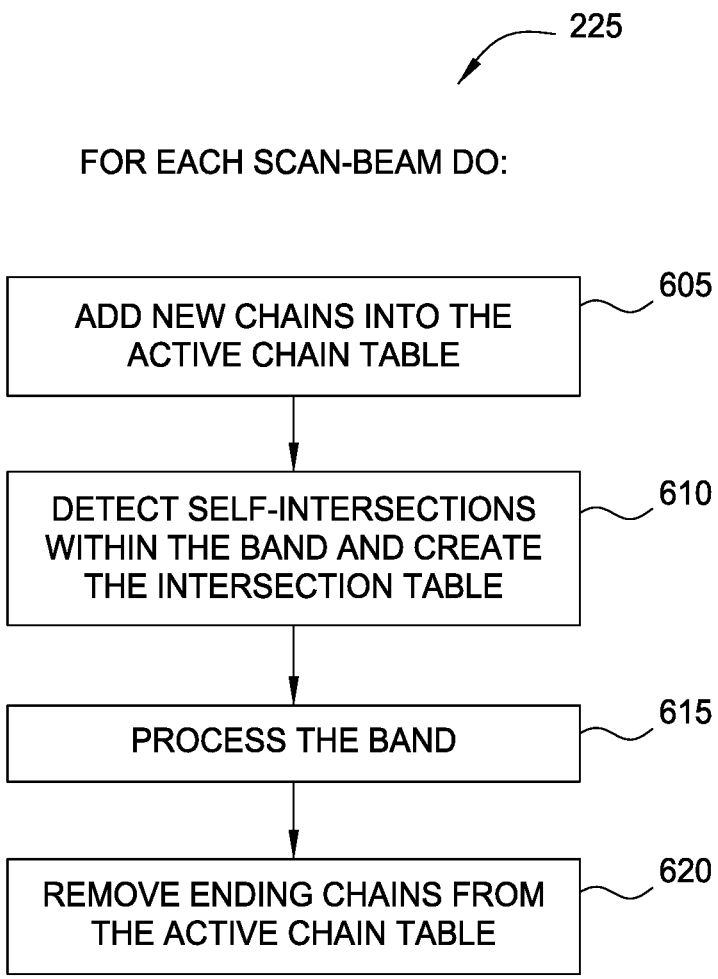
FIG. 6 illustrates an exemplary process for sweeping scan beams and appending vertices to monotone polygons.

FIG. 6 illustrates an exemplary process for step 215. The process illustrated in FIG. 6 is repeated for each band 515a.

At step 605, microprocessor 115 executes instructions to add new monotone chains to the active chain table. An active chain is a monotone chain that has a vertex on lower scan beam 505a (a new chain), or a monotone chain that has a vertex on upper scan beam 505b (an ending chain), or a monotone chain that has a vertex below lower scan beam 505*a* and a next vertex above upper scan beam 505*b*, and an edge that passes through band 515*a*.

Referring to FIG. 5B, vertex A corresponds to new chain 510*a* and 510*b*, vertex 535 corresponds to ending chains 530*a* and 530*b*. Chains 510*a*, 510*b*, 530*a*, 530*b*, and monotone chain 520, are active chains. The corresponding vertices and edges of these active chains may be stored in the active chain table in memory 120 for one iteration of the process illustrated in FIG. 6. Further stored in the active chain table are the X-axis positions of vertices A and 535, the X-axis locations where ending chains 530*a* and 530*b* cross lower scan beam 505*a*, the X-axis locations where new chains 510*a* and 510*b* cross upper scan beam 505*b*, the X-axis locations where monotone chain 520 crosses lower scan beam 505*a* and upper scan beam 505*b*, respectively, and the slope of each of the active chains. Accordingly, active chain table contains the X-axis locations where all of the active chains intersect lower scan beam 505*a* and upper scan beam 505*b*.

Further to step 605, microprocessor 115 may sort the active chains in the active chain table by X-axis locations, and those chains sharing a vertex (e.g., new chains 510*a* and 510*b*) may be sorted by slope.

At step 610, microprocessor 115 executes instructions to identify self-intersections within band 515*a*. In doing so, microprocessor 115 executes instructions to determine if the X-order of the intersections of any two active chains has reversed, or in other words, two active chains have swapped X-order. If the X-order of two active chains reverses between lower scan beam 505*a* and upper scan beam 505*b*, it is due to a self-intersection, or crossing of two active chains.

Figure 7A:
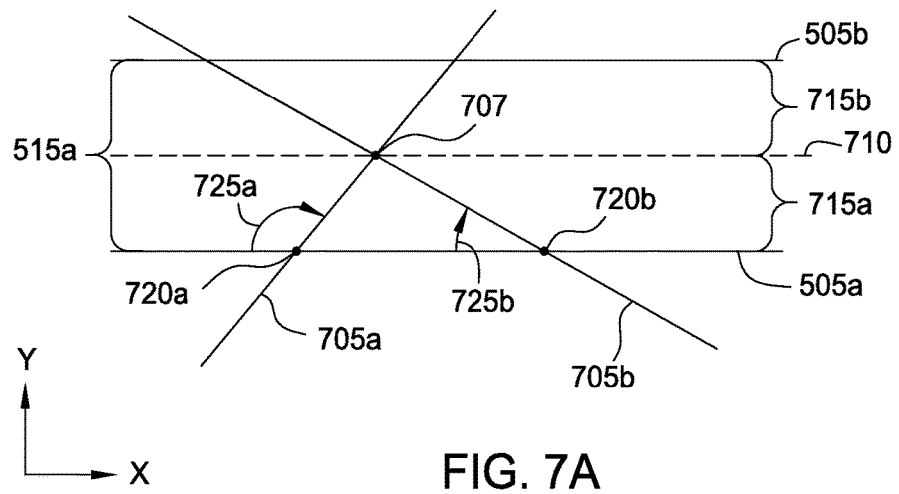
FIG. 7A illustrates two intersecting edges, within a band.

FIG. 7A illustrates an exemplary case of two self-intersecting active chains 705*a* and 705*b*. As illustrated, the X-order of active chains 705*a* and 705*b* switches between lower scan beam 505*a* and upper scan beam 505*b*, and they intersect at self-intersection point 707. The Y-axis position of self-intersection point 707 is defined as a sub-scan beam 710, which defines a lower sub-band 715*a* and an upper sub-band 715*b*.

If a self-intersection is identified, microprocessor 115 executes instructions to compute the location of self-intersection point 707. It may do so by separately computing the location of self-intersection point 707 from the perspective of active chain 705*a*, and then from the perspective of active chain 705*b*. In performing the latter computation, microprocessor 115 may retrieve the locations (e.g., x and y coordinates) of where active chains 705*a* and 705*b* respectively cross lower scan beam 505*a* and upper scan beam 505*b*. With this information, microprocessor 115 executes instruction to compute the slope 725*a* of active chain 705*a* (or retrieve slope 725*a* from the monotone chain table in memory 120), and using the x and y coordinates of lower scan beam crossing point 720*a*, computes an estimated location of self-intersection point 707. Microprocessor 115 may then perform similar computations to determine the location of self-intersection point 707 from the perspective of active chain 705*b*. In doing so, microprocessor 115 may execute instructions to compute the slope 725*b* (or retrieve slope 725*b* from the monotone chain table in memory 120) of active chain 705*b*, and using the x and y coordinates of lower scan beam crossing point 720*b*, computes the location of intersection point 707. In this case, there are two estimates for the location of self-intersection point 707. Further to step 610, microprocessor 115 may execute instructions to "snap" these two estimates into a single value for self-intersection point 707. It may do so by applying a predetermined epsilon c, which may be stored as a parameter in memory 120. If the difference in position between the two computations of self-intersection point 707 are within this epsilon, then microprocessor 115 may assign a single location as the location of self-intersection point 707*a*.

Further to step 610, microprocessor 115 executes instructions to store the Y-axis position of sub-scan beam 710 and the location of self-intersection point 707 in an intersection table within memory 120.

Figure 7B:
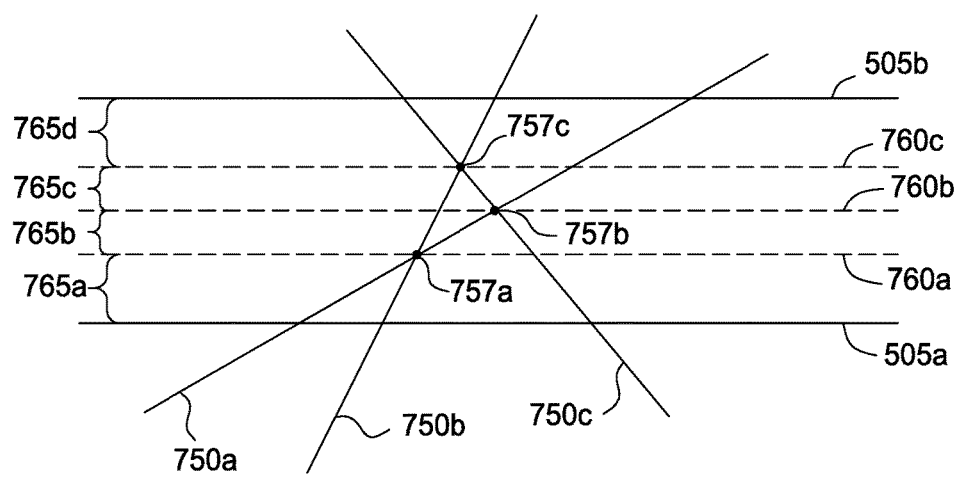
FIG. 7B illustrates a plurality of intersecting edges within a band.

FIG. 7B illustrates an exemplary case in which there are three active chains 750*a-c* that cross at multiple self-intersections 757*a-c*. As illustrated, each self-intersection 757*a-c* defines a sub-scan beam 760*a-c*, which in turn define sub-bands 765*a-d*. In this case, for step 610, microprocessor 115 may execute instructions to compute self-intersections 757*a-c* individually by computing intersections for each permutation of active chains: e.g., 750*a*/750*b*, 750*a*/750*c*, and 750*b*/750*c*. For each identified self-intersection 757*a-c*, microprocessor 115 executes instructions to store the Y-axis positions of sub-scan beams 760*a-c*, and the locations of self-intersection points 757*a-c*, in the intersection table within memory 120. In doing so, the sub-scan beams 760*a-c* are sorted by their Y-axis positions, and the self-intersection points 757*a-c* are sorted by the Y-axis positions.

At step 615, microprocessor 115 executes instructions to process band 515*a*.

Figure 8:
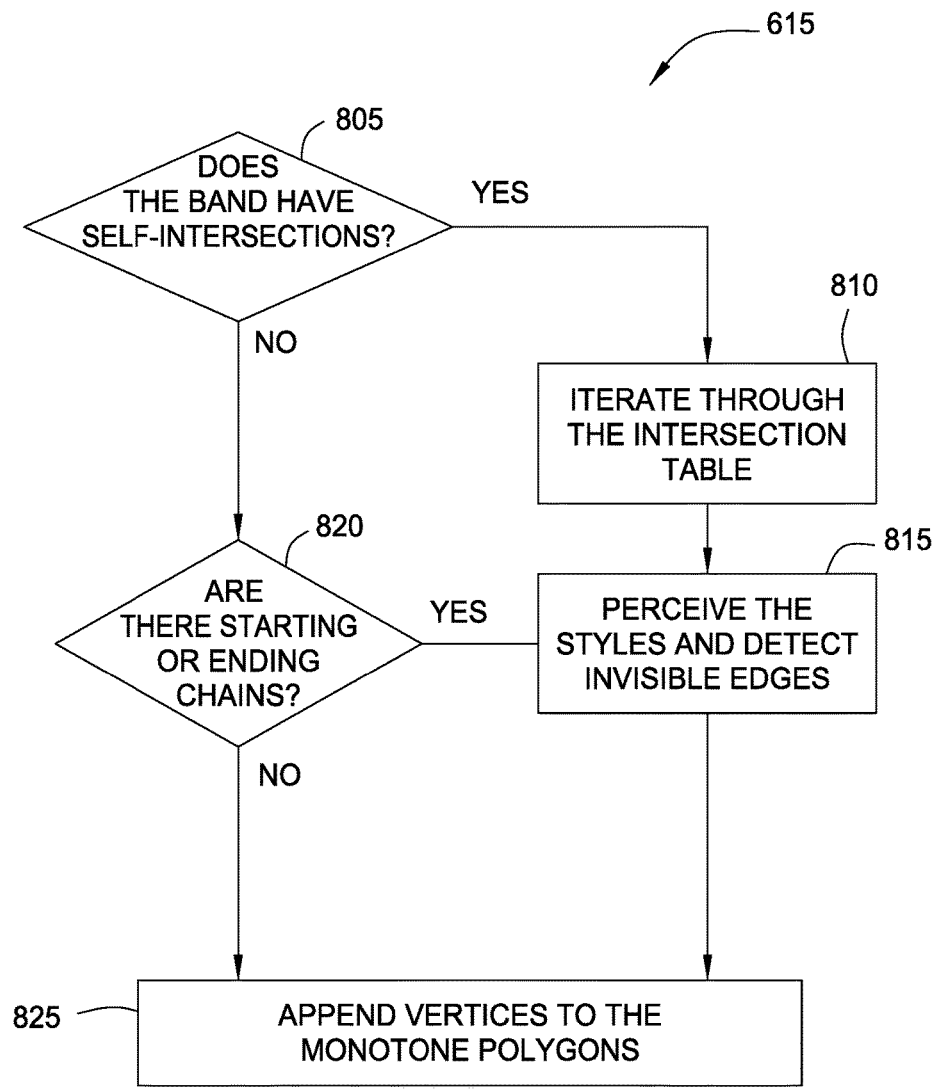
FIG. 8 illustrates an exemplary procedure for processing a band.

FIG. 8 illustrates an exemplary process for step 615. At step 805, for the current band 515*a*, microprocessor 115 executes instructions determine if band 515*a* has any self-intersections, which may be done by checking if there are any entries in the intersection table in memory 120 corresponding to current band 515*a*. If there are, then process 615 proceeds via the "Yes" branch of step 805 to step 810.

At step 810, microprocessor 115 executes instructions to iterate through the intersection table. In doing so, microprocessor 115 executes instructions to process each sub-band 515*a-b* or 765*a-b* according to process 615. Being a recursive process, the remainder of process 615 will be described in the context of processing sub-bands 765*a* and 765*b*. It will be clear to one skilled in the art that this description of process 615 will apply to the processing of the remaining sub-bands 765*c-d* and bands 505*b-j*.

At step 815, microprocessor 115 executes instructions to perceive or identify the styles associated with the active chains and to detect invisible edges. In doing so, microprocessor 115 may execute instructions to create a style perception table corresponding to each active chain's crossing of the lower scan beam 505*a* and upper sub-scan beam 760*a* of sub-band 765*a*.

FIG. 7C illustrates sub-bands 765*a* and 765*b*, with active chains 750*a-c*. Also illustrated is crossing node 770*a*, which corresponds to where active chain 750*a* crosses sub-scan beam 760*a*; crossing node 770*b*, which corresponds to where active chain 750*b* crosses sub-scan beam 760*a*; and crossing node 770*c*, which corresponds to where active chain 750*c* crosses sub-scan beam 760*a*. It will be readily apparent to one skilled in the art that the processing of sub-band 765*a* also includes there active chains 750*a-c* cross lower scan beam 505*a*.

For each crossing node 770*a-c*, microprocessor 115 may execute instructions to create a style perception according to the following exemplary format

| LEFT ABOVE | RIGHT ABOVE |
| LEFT BELOW | RIGHT BELOW | where LEFT ABOVE refers to the style to the left of the active chain above sub-scan beam 760a, RIGHT ABOVE refers to the style to the right of the active chain above sub-scan beam 760a, etc.

As illustrated in FIG. 7C, the style perception tables corresponding to crossing nodes 770a-c may be as follows (in order):

| 770a | |
|---|---|
| Blue | Red |
| Green | Blue |

| 770b | |
|---|---|
| Green | Blue |
| Blue | Red |

| 770c | |
|---|---|
| Red | Green |
| Red | Green |

Further to step 815, microprocessor 115 executes instructions to determine if a given crossing node corresponds to a contributing edge. It may do so according to the following relations: if LEFT ABOVE=RIGHT ABOVE, then it means that the given edge of that active chain becomes a hidden edge. Similarly, if LEFT BELOW=RIGHT BELOW, then it means that the edge was hidden and after the current scan beam it becomes visible. In this way, hidden edges—and thus hidden fill areas—may be removed, and the geometry of the corresponding complex polygon may become flattened. If, on the other hand LEFT BELOW≠LEFT ABOVE and/or RIGHT BELOW≠RIGHT ABOVE, then it means that the corresponding crossing point (for example, 770a) should be identified as a vertex. In the latter case, microprocessor 115 may execute instructions to assign the crossing point (e.g., 770a) to monotone chain table 330 as an event point.

Further, if the style changes for only one of the RIGHT and LEFT side of the given active chain, then it represents the case in which one of the active chains is an ending chain and the other proceeds to the next sub-band. This may be described as a vertex that is intersected by the edge of another active chain. The approach described herein processes this non-simple case.

A further advantage of this approach is that it automatically correctly flattens the geometry regardless of the fill rule (e.g., Non-Zero or Even-Odd) employed by the vector graphics data format.

Figure 9:
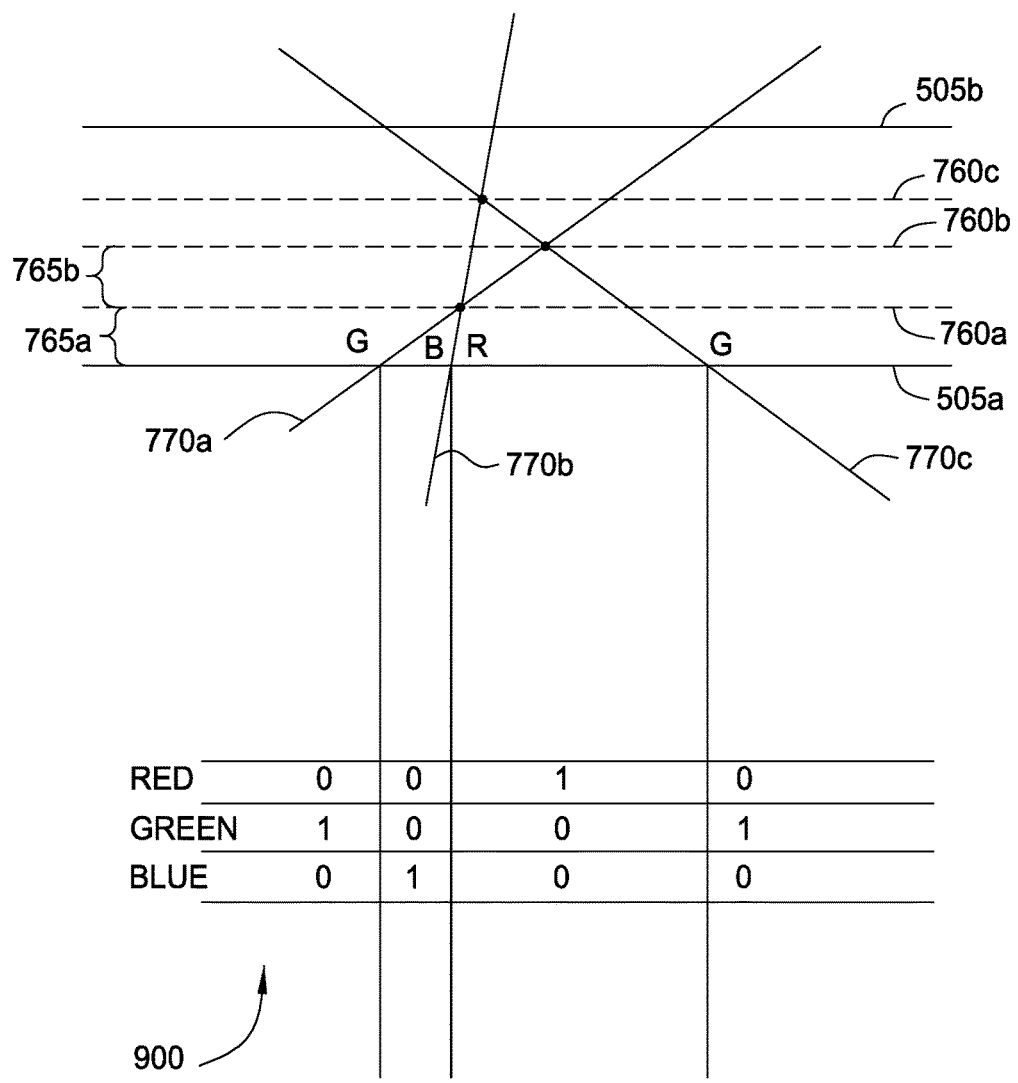
FIG. 9 illustrates an exemplary approach to perceiving style.

FIG. 9 illustrates an additional or alternate approach to performing style perception at step 815, in which the vector graphics data obtained at step 205 is represented as geometrically flat. In this variation, microprocessor 115 executes instructions to created an active style table 900 corresponding to the lower scan beam 505a and the upper sub-scan beam 760a. Each active style table has each a plurality of rows, each row corresponding to a style present within the active chain table stored in memory 120. Active style table has a plurality of columns, each column corresponding to the presence of an edge of an active chain or a vertex.

In this variation, microprocessor 115 executes instructions to populate active style table 900 so that the style present between edges and/or vertices within the given scan beam or sub-scan beam. This may be done using either the Non-Zero fill rule or the Even-Odd fill rule. If the Non-Zero fill rule is used, then the direction corresponding to a given edge (stored in the monotone chain table) is used to compute which style is to be used to fill the area corresponding to the given column of active style table 900.

In the latter case, in which the vector graphics data in memory 120 is already represented as geometrically flat, processing the image is generally simpler in that there are no hidden edges or fill areas. However, there are many duplicate edges, in which two polygons share an edge at their boundary. By processing the vector graphics data as described herein—decomposing polygons into monotone chains, and making use of the styles to the left and right of each monotone chain—many of the complications, such as image errors or computational inefficiency, are substantially mitigated.

In either implementation of style perception for step 815, the horizontal edges 325 may be properly processed, based on the identified change in style as described above.

Note that if step 815 is executed in the context of the presence of self-intersections (i.e., from the "Yes" branch of step 805), then step 815 is repeated for all of the sub-bands 765a-d within current band 505a.

One of the features of iteratively processing the sub-bands according to steps 810-815 is that the style perception step 815 may provide for stability, or self-regulation. Stability is provided whereby if there are two self-intersections that are very close in location (e.g., not far beyond epsilon c), there is a possibility that numerical imprecision due to binary number representation may lead to an inversion in perceived styles. Due to the limited precision in numeric calculations it is impossible to avoid incorrect perception in very complex and/or degenerate cases. This incorrect perception of styles may lead to an image error that, were it not for the iteration of steps 810-815, cause the style error to propagate and corrupt the image. Accordingly, if an incorrect style perception were to occur, the next iteration of step 815 would correct the error because the two edges associated with the incorrect style perception would be further apart, and numerical imprecision is no longer an issue. Note that in case incorrect perception occurs it does not affect the visual result because the areas of incorrect styles are small and not visible; in typical cases they are extremely smaller than the area of a display pixel. The self-regulating nature of the method prevents from propagating the errors in the next scan beams.

The result of each iteration of step 815 is an updated monotone chain table 450 that includes all newly identified event points, their corresponding edges, and their corresponding left and right styles. Monotone chain table 450 is also updated in that hidden edges detected in the style perception step 815 are removed. Alternatively, the result of each iteration of step 815 may be an output mesh corresponding to updated monotone chain table 450, which includes all the event points and their associated styles, in which the vertices corresponding to hidden edges are removed.

Returning to step 805, if there are no entries in the intersection table corresponding to current band 515a, it means that band 515a does not have any self-intersections. If this is the case, process 615 proceeds via the "No" branch of step 805 to step 820.

At step 820, microprocessor 115 executes instructions to determine of current band 515a has any starting or ending chains. It may do so by examining the active chain table in memory 120. The presence of a starting or ending chain means that there is an event point (in this case, a minimum vertex on lower scan beam 505a or a maximum vertex on upper scan beam 505b). If there are no starting or ending chains, process 615 proceeds to via the "No" branch of step 820 to step 825, which is discussed further below.

If there is either a starting or ending chain in current band 515a, then process 615 proceeds via the "Yes" branch of step 820 to step 815. At step 815, microprocessor 115 executes instructions to perceive styles and detect invisible edges in the same manner as described above with regard to sub-band 765a.

Process 615 next proceeds to step 825. At step 825, microprocessor 115 executes instruction to append vertices to a plurality of monotone polygons using information in the active chain table and monotone chain table 450. Step 825 may be an integrative process, whereby the information gained in each iteration of step 815 or 820 is added to monotone polygons from the previous iteration.

Figure 10A:
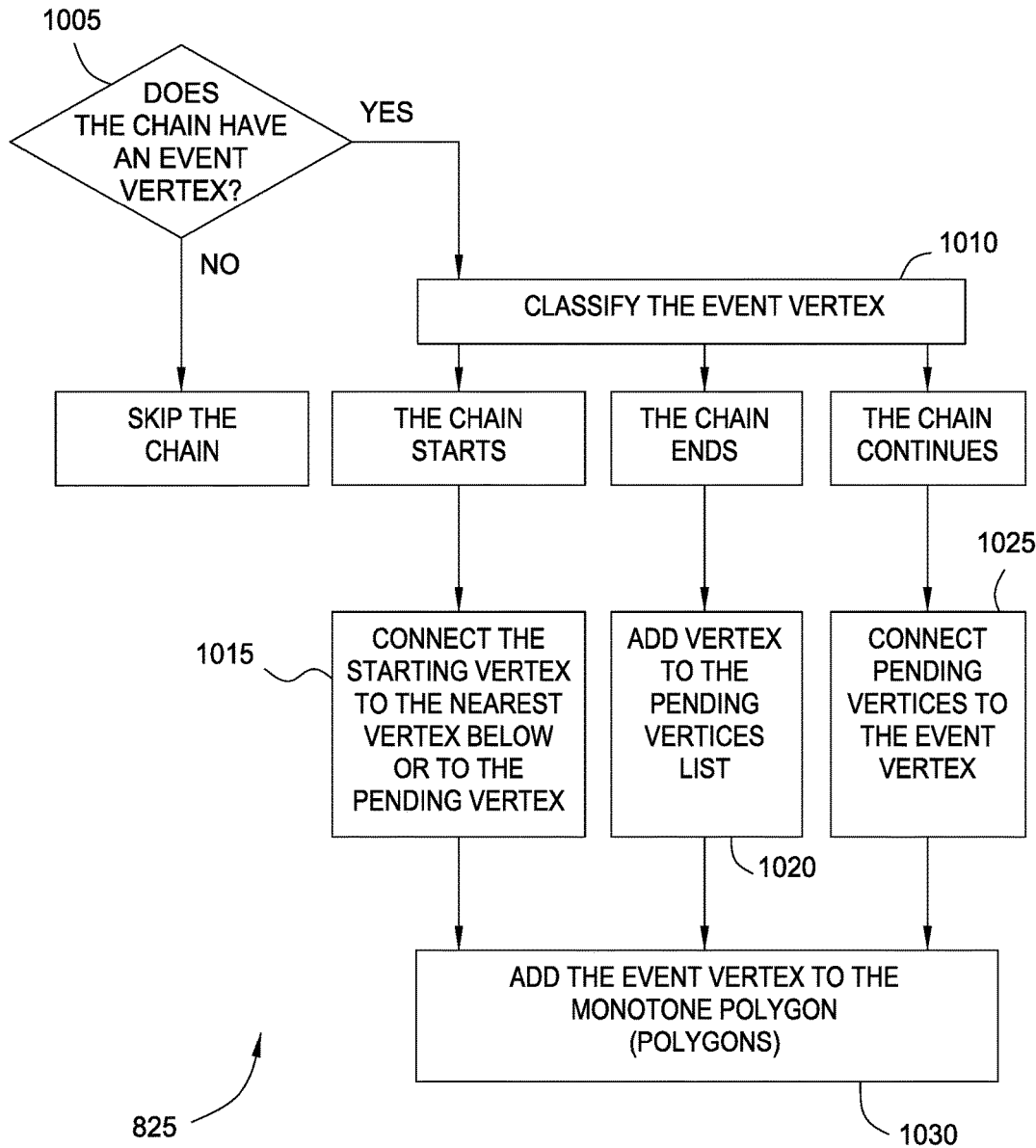
FIG. 10A illustrates an exemplary process for appending vertices to the monotone polygons.

FIG. 10A illustrates an exemplary process for step 825. At step 1005, microprocessor 115 executes instructions to determine if a given active chain has an event vertex. If so, process 825 proceeds along the "Yes" branch of step 1005 to step 1010. At step 1010, microprocessor 115 executes instructions to classify the event vertex into either a vertex that starts a chain, ends a chain, or is part of a continuing chain.

Figure 10B:
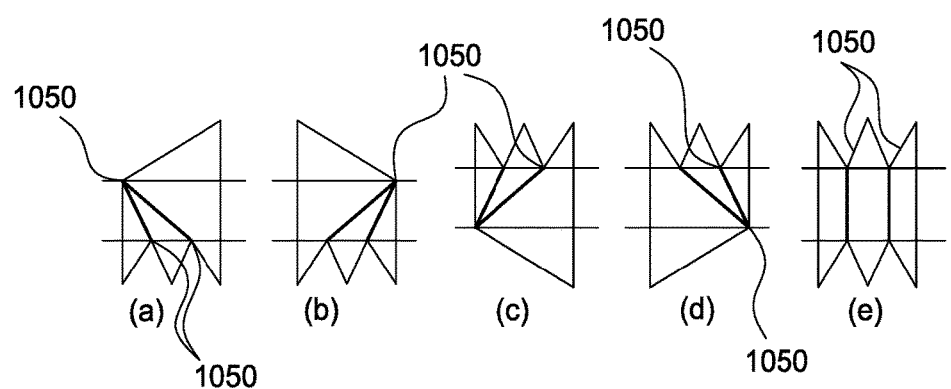
FIG. 10B illustrates exemplary polygons being converted into monotone polygons.

FIG. 10B illustrates a plurality of chains having event vertices, as might be expected as the output of step 815. Illustrated are two types of event vertices: starting vertices 1050, and pending vertices 1055, which are explained further below.

Process 825 proceeds to step 1015 if the event vertex is at the start of a chain. In this case, microprocessor 115 executes instructions to connect this vertex, which is a starting vertex 1050, to the nearest pending vertex 1055. Process 825 proceeds to step 1020 if the event vertex is at the end of a chain. In this case, microprocessor 115 executes instructions to add this event vertex to a list of pending vertices 1055. Process 825 proceeds to step 1025 if the event vertex is part of a continuing chain. In this case, microprocessor 115 executes instructions to connect the pending vertices 1055 to this event vertex.

At step 1030, microprocessor 115 executes instructions to add the event vertex to the monotone polygons stored in memory 120.

Figure 11:
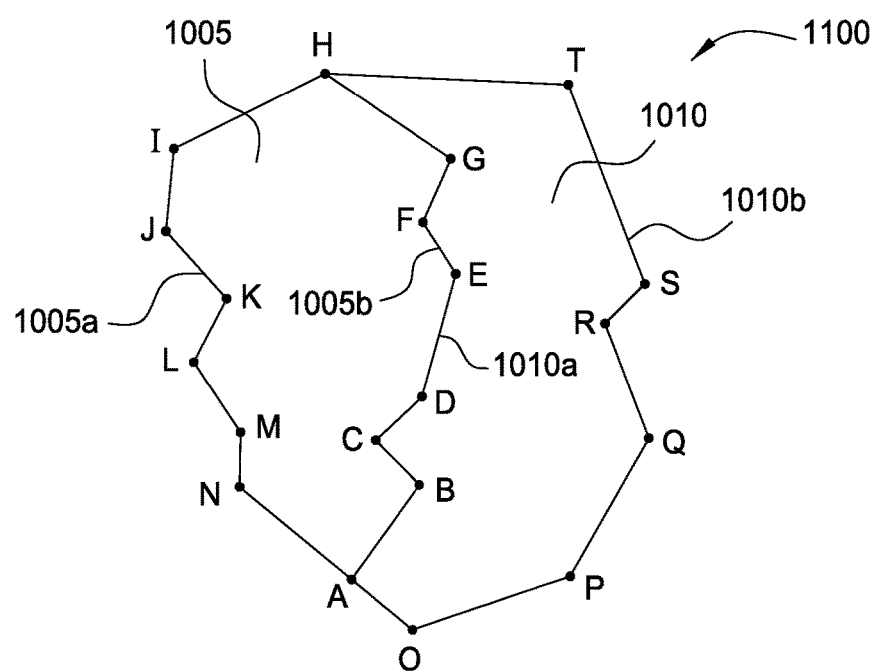
FIG. 11 illustrates two exemplary monotone polygons.

FIG. 11 illustrates a FIG. 1100 having two exemplary monotone polygons 1005 and 1010. As used herein, monotone polygon may refer to a polygon formed of two monotone chains. Monotone polygon 1005 is formed of left monotone chain 1005a and right monotone chain 1005b; and monotone polygon 1010 is formed of left monotone chain 1010a and right monotone chain 1010b. Each of monotone chains 1005a-b and 1010a-b is represented in monotone chain table 450.

At step 825, microprocessor 115 may execute instructions to retrieve the event points and associated styles corresponding to current band 505a (including all sub-bands 765a-d, if present), and add to each monotone polygon. In doing so, microprocessor 115 may execute instructions to construct an output mesh of vertices corresponding to each monotone polygon and its associated style by forming a plurality of trapezoids, wherein the upper and lower boundary of each trapezoid is the upper scan beam and the lower scan beam, respectively, and the sides of the trapezoid are corresponding edges of two monotone chains that bound a single style.

For each iteration of step 825, microprocessor 115 may execute instructions to add the vertices corresponding to each trapezoid to the vertices of the corresponding trapezoid (if present) of the previous iteration of step 825. In this manner, a plurality of monotone polygons, examples of which are illustrated in FIG. 10, are formed. Microprocessor 115 may store the vertices (or edges between vertices) and corresponding styles of each appended monotone polygon in memory 120 as an output mesh, or table of vertices and associated styles.

Returning to FIG. 6, at step 620, microprocessor 115 may execute instructions to remove the ending chains from the active chain table stored in memory 120. In doing so, successive iterations of the step of processing the band 615 does not unnecessarily add to the size of the active chain table, which may provide for more efficient use of memory 120.

Returning to FIG. 2, at step 230, microprocessor 115 executes instructions to triangulate the monotone polygons created and stored at step 825. This may be done using triangulation methods that are known to the art.

Figure 12:
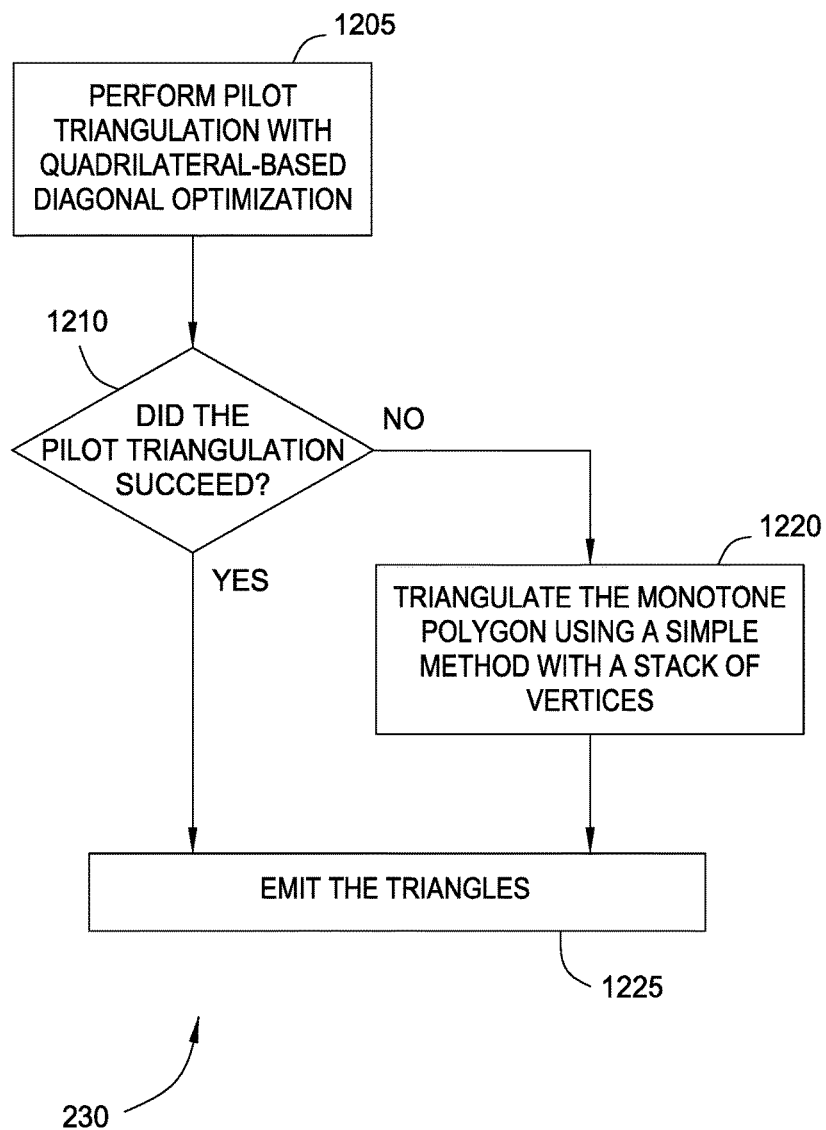
FIG. 12 illustrates an exemplary process for triangulating monotone polygons.
Figure 13:
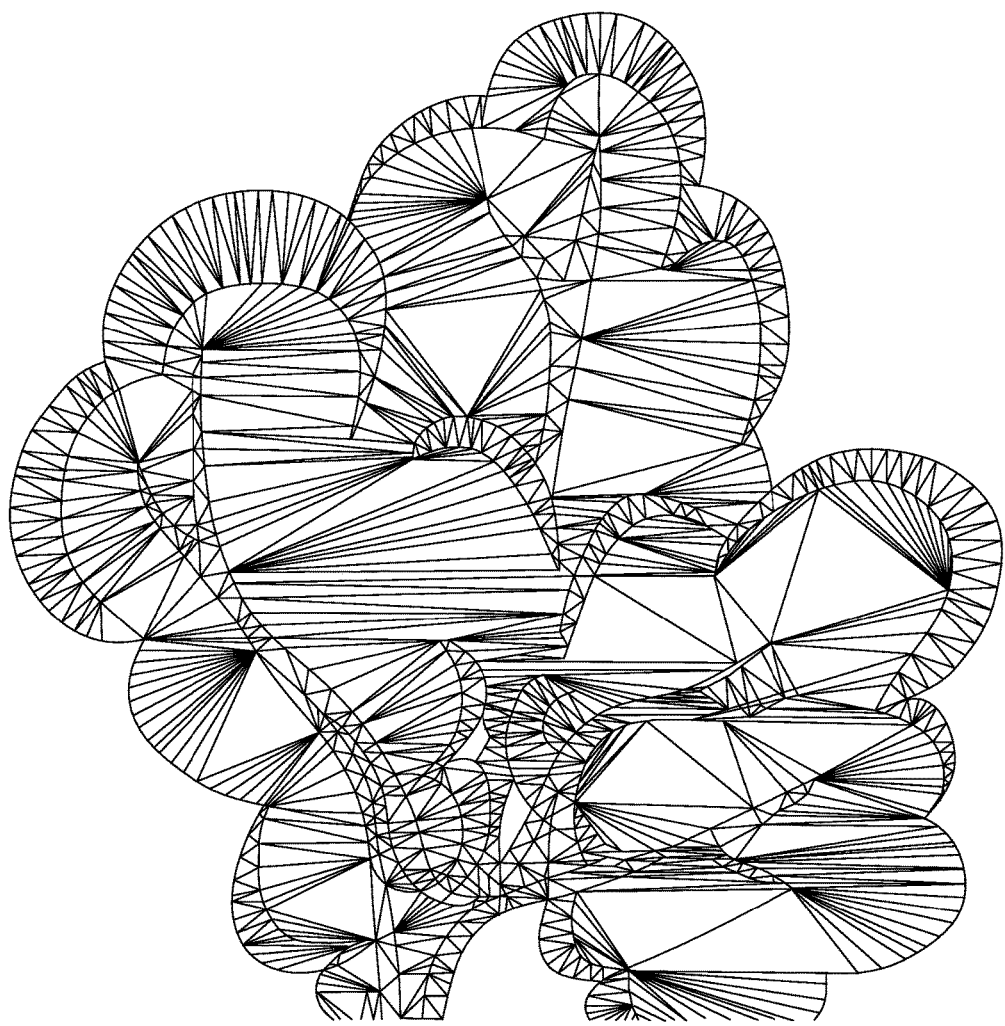
FIG. 13 illustrates an exemplary image tessellated into triangles.

FIG. 12 illustrates an exemplary process for triangulating monotone polygons at step 230. At step 1205, microprocessor 115 executes instructions to perform pilot triangulation with quadrilateral-based diagonal optimization. The optimization is performed by considering each of four points of the monotone polygon as quadrilaterals. Each quadrilateral is subdivided into two triangles using the shortest diagonal. In most cases the pilot triangulation succeeds. However, in some cases it may result in overlapping triangles, which is easy to detect. In case if any overlapping triangles are detected, the pilot triangulation fails.

At step 1210, microprocessor 115 executes instruction to determine if the pilot triangulation of step 1205 succeeded. If so, process 230 proceeds via the "No" branch of step 1210 to step 1215.

At step 1220, microprocessor 115 executes instructions to subdivide the monotone polygon into a plurality of triangles using a simple and well known method with a stack of vertices.

The result of step 230 is a plurality of triangles, or triangle mesh, with each triangle having an associated style. Microprocessor 115 may execute instructions to store the data corresponding to the triangle mesh in memory 120.

FIG. 11 illustrates an exemplary image tessellated into a triangle mesh using the above processes.

At step 235, microprocessor 115 executes instructions to process the triangle mesh so that the associated data is displayed on display 125.

Variations to process 200 are possible and within the scope of the invention. For example, instead of (or in addition to) step 825, the output of the style perception step 815 may be provided to other types of processes. For example, the output of step 815 may be used for Boolean operations on polygons, such as Intersection, Union, Difference, and Exclusive-Or.

In another variation, process 200 may be modified to process curved polygons, such as quadratic or cubic Bezier curves, or any other type of curve that can be easily subdivided into two adjacent parts. In this variation, the triangulation of curved shapes may include two phases: partitioning the shape into curved Y-monotone polygons, and triangulation of these polygons. In this variation, the curves may be better preserved for quick scaling operations, such as zooming in and out of an image.

Other variations to process 200 are possible. For example, all of the directions corresponding to each of the edges may be reversed, as long as all of the directions are reversed consistently. Further, although the scan beams discussed defined by Y-axis positions, one skilled in the art will recognize that all mention of Y-axis could be switched with the X-axis, and that the scan beams could thus be represented vertically instead of horizontally.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer-implemented method for displaying an image having a plurality of multi-styled shapes on a computer display, comprising:
    creating a plurality of monotone chains corresponding to each of the plurality of multi-styled shapes;
    creating, via a microprocessor, a monotone chain table populated with the plurality of monotone chains;
    assigning a plurality of scan beams corresponding to the plurality of monotone chains;
    identifying a left style and a right style corresponding to each of the plurality of monotone chains between two adjacent scan beams;
    computing a plurality of monotone polygons corresponding to the monotone chains, wherein each edge included in each monotone polygon is part of a monotone chain having a left style and a right style; and
    computing a plurality of triangles from the plurality of monotone polygons.

2. The computer-implemented method of claim 1, wherein identifying a left style and a right style comprises using one of the non-zero fill rule and the even-odd fill rule.

3. The computer-implemented method of claim 2, wherein identifying a left style and a right style comprises identifying a left style above a given scan beam, a left style below the given scan beam, a right style above the given scan beam, and the right style below the given scan beam.

4. The computer-implemented method of claim 3, wherein identifying a left style and a right style comprises identifying a hidden edge if the left style below the given scan beam is the same style as the right style below the given scan beam.

5. The computer-implemented method of claim 3, wherein identifying a left style and a right style comprises identifying a hidden edge if the left style above the given scan beam is the same style as the right style above the given scan beam.

6. The computer-implemented method of claim 1, further comprising:
    identifying a self-intersection between the two adjacent scan beams before identifying a left style and a right style; and
    assigning a sub-scan beam to a Y-axis position corresponding to the self-intersection.

7. The computer-implemented method of claim 6, further comprising the step of identifying a left style above the sub-scan beam, a left style below the sub-scan beam, a right style above the sub-scan beam, and the right style below the sub-scan beam.

8. The computer-implemented method of claim 7, further comprising identifying a hidden edge if the left style below the sub-scan beam is the same style as the right style below the given sub-scan beam.

9. The computer-implemented method of claim 7, further comprising identifying a vertex if the left style below the sub-scan beam is different from the left style above the sub-scan beam.

10. The computer-implemented method of claim 7, further comprising identifying a vertex if the right style below the sub-scan beam is different from the right style above the sub-scan beam.

11. The computer-implemented method of claim 1, wherein the step of computing a plurality of monotone polygons comprises:
    identifying a vertex corresponding to the start of a monotone chain; and
    connecting the vertex to a pending vertex.

12. The computer-implemented method of claim 1, wherein the monotone chain table includes information regarding a left style, a right style, vertices, and direction for each of the plurality of monotone chains.

13. A non-transitory computer readable medium encoded with a program for displaying an image having a plurality of multi-styled shapes, the program comprising the steps of:
    creating a plurality of monotone chains corresponding to each of the plurality of multistyled shapes;
    creating a monotone chain table populated with the plurality of monotone chains;
    assigning a plurality of scan beams corresponding to the plurality of monotone chains;
    identifying a left style and a right style corresponding to each of the plurality of monotone chains between two adjacent scan beams;
    computing a plurality of monotone polygons corresponding to the monotone chains, wherein each edge included in each monotone polygon is part of a monotone chain having a left style and a right style; and
    computing a plurality of triangles from the plurality of monotone polygons.

14. The computer readable medium of claim 13, wherein the step of identifying a left style and a right style comprises using one of the non-zero fill rule and the even-odd fill rule.

15. The computer readable medium of claim 14, wherein the step of identifying a left style and a right style comprises identifying a left style above a given scan beam, a left style below the given scan beam, a right style above the given scan beam, and the right style below the given scan beam.

16. The computer readable medium of claim 15, wherein the step of identifying a left style and a right style comprises identifying a hidden edge if the left style below the given scan beam is the same style as the right style below the given scan beam.

17. The computer readable medium of claim 15, wherein the step of identifying a left style and a right style comprises identifying a hidden edge if the left style above the given scan beam is the same style as the right style above the given scan beam.

18. The computer readable medium of claim 13, further comprising the steps of:
    identifying a self-intersection between the two adjacent scan beams before identifying a left style and a right style; and
    assigning a sub-scan beam to a Y-axis position corresponding to the self-intersection.

19. The computer readable medium of claim 18, further comprising the step of identifying a left style above the sub-scan beam, a left style below the sub-scan beam, a right style above the sub-scan beam, and the right style below the sub-scan beam.

20. The computer readable medium of claim 19, further comprising the step of identifying a hidden edge if the left style below the sub-scan beam is the same style as the right style below the given sub-scan beam.

21. The computer readable medium of claim 19, further comprising the step of identifying a vertex if the left style below the sub-scan beam is different from the left style above the sub-scan beam.

22. The computer readable medium of claim 19, further comprising the step of identifying a vertex if the right style below the sub-scan beam is different from the right style above the sub-scan beam.

23. The computer readable medium of claim 13, wherein the step of computing a plurality of monotone polygons comprises:
   identifying a vertex corresponding to the start of a monotone chain; and
   connecting the vertex to a pending vertex.

24. The computer readable medium of claim 13, wherein the monotone chain table includes information regarding a left style, a right style, vertices, and direction for each of the plurality of monotone chains.

25. The computer readable medium of claim 13, wherein each edge included in each monotone polygon is a segment of a monotone chain.

26. The computer readable medium of claim 13, wherein each edge included in each monotone polygon is part of a monotone chain having a direction.

27. A system for displaying an image having a plurality of multi-styled shapes, comprising:
   a display device;
   a processor coupled to the display device; and
   a computer readable medium coupled to the processor, the computer readable medium encoded with a program for displaying an image having a plurality of multi-styled shapes, the program comprising the steps of:
      creating a plurality of monotone chains corresponding to each of the plurality of multi-styled shapes;
      creating a monotone chain table populated with the plurality of monotone chains;
      assigning a plurality of scan beams corresponding to the plurality of monotone chains;
      identifying a left style and a right style corresponding to each of the plurality of monotone chains between two adjacent scan beams;
      computing a plurality of monotone polygons corresponding to the monotone chains, wherein each edge included in each monotone polygon is part of a monotone chain having a left style and a right style;
      computing a plurality of triangles from the plurality of monotone polygons; and
      displaying the plurality of triangles on the display device.

28. The system of claim 27, wherein the monotone chain table includes information regarding a left style, a right style, vertices, and direction for each of the plurality of monotone chains.

* * * * *